(12) United States Patent
Morrison et al.

(10) Patent No.: US 7,129,815 B2
(45) Date of Patent: Oct. 31, 2006

(54) REMOTE ENTRY TRANSMITTER WITH TRANSMISSION IDENTIFICATION CODES

(75) Inventors: Brian Morrison, Harrison Township, MI (US); Patrick A. Banas, Sterling Heights, MI (US); David Reimus, Warren, MI (US); Jacob G. Epp, Saline, MI (US); Gerald L. Ostrander, Davison, MI (US)

(73) Assignee: Siemens VDO Automotive Corporation, Auburn Hills ( * ) Notice: Subject to any disclaimer, the term of this patent is extended or adjusted under 35 U.S.C. 154(b) by 773 days.

(21) Appl. No.: 09/915,033

(22) Filed: Jul. 25, 2001

(65) Prior Publication Data

US 2002/0024417 A1    Feb. 28, 2002

Related U.S. Application Data

(60) Provisional application No. 60/227,540, filed on Aug. 24, 2000.

(51) Int. Cl.
*G06F 7/04* (2006.01)

(52) U.S. Cl. ............ 340/5.25; 340/5.65; 340/5.72

(58) Field of Classification Search .......... 340/5.25, 340/5.26, 426.13, 426.14, 426.17, 5.72, 5.65, 340/426.36; 361/172; 377/33; 380/45; 700/116; 713/170
See application file for complete search history.

(56) References Cited

U.S. PATENT DOCUMENTS

| | | | |
|---|---|---|---|
| 4,525,805 A | * | 6/1985 | Prosan et al. ............. 340/5.25 |
| 4,683,540 A | * | 7/1987 | Kurosu et al. ............. 700/1.16 |
| 4,881,148 A | * | 11/1989 | Lambropoulos et al. .... 361/172 |
| 5,144,667 A | * | 9/1992 | Pogue et al. .................. 380/45 |
| 5,363,448 A | * | 11/1994 | Koopman et al. .......... 713/170 |
| 5,412,379 A | * | 5/1995 | Waraksa et al. ........... 340/5.26 |
| 5,477,041 A | * | 12/1995 | Miron et al. ............... 340/5.28 |
| 5,625,349 A | * | 4/1997 | Disbrow et al. ........... 340/5.25 |
| 5,675,622 A | * | 10/1997 | Hewitt et al. ................. 377/33 |
| 5,767,784 A | | 6/1998 | Khamharn |
| 6,380,843 B1 | * | 4/2002 | Guerin et al. .............. 340/5.25 |

FOREIGN PATENT DOCUMENTS

| | | |
|---|---|---|
| DE | 196 33 802 A1 | 2/1998 |
| DE | 198 41 514 A1 | 4/1999 |
| EP | 0 663 650 A2 | 12/1994 |
| GB | 2 257 552 A | 1/1993 |

OTHER PUBLICATIONS

International Search Report, dated Feb. 20, 2002.
Int'l Written Opinion, dated May 30, 2002.

* cited by examiner

*Primary Examiner*—Edwin C. Holloway, III

(57) ABSTRACT

A transmitter identification code is designed such that the code varies as the code is assigned. In one embodiment the code will include information with regard to the date and time that the code is initially determined. In a second embodiment the code is provided by incrementing a counter, and then modifying that counter information such that the final code is non-sequential.

6 Claims, 1 Drawing Sheet

REMOTE ENTRY TRANSMITTER WITH TRANSMISSION IDENTIFICATION CODES

This application claims priority to U.S. Provisional Application No. 60/227,540 filed on Aug. 24, 2000.

BACKGROUND OF THE INVENTION

This application relates to the provision of a transmission identification code to a remote entry transmitter wherein the code is assigned in a fashion such that it will always be unique, and such that the transmission identification codes for any two consecutive transmitters will not be consecutive binary numbers.

Remote entry transmitters are utilized in most modem vehicles. In a remote entry transmitter a signal is sent from a small signaling device, typically known as a keyfob, to the vehicle. The vehicle receives the signal and controls components on the vehicle based on the signal. As an example, remote entry transmitters are typically utilized to lock and unlock the doors on the vehicle.

When the signal is initially sent from the transmitter to the vehicle, the vehicle checks the signal to determine whether the transmitter is an appropriate transmitter for the vehicle. Transmitters typically have a unique code which is distinct from other transmitters. In this way, the control on the vehicle can identify whether the particular transmitter sending the particular signal is a transmitter which has been programmed for the vehicle. Typically the programming occurs at the factory, when the vehicle is initially assembled and associated with a particular transmitter. Under some circumstances a transmitter may be programmed to a vehicle later, such as when a keyfob has been lost, etc.

Some vehicle manufacturers have a goal of ensuring that no two transmitter identification codes will be identical. This has a resulted in a requirement for storing all of the previously used codes such that it can be ensured that no future identical code is utilized.

It would be desirable to provide a simplified way of assigning transmission identification codes to remote entry transmitters that eliminate the need to store all prior codes.

SUMMARY OF THE INVENTION

In a disclosed embodiment of this invention, a transmitter identification code is provided in a fashion such that the codes are non-consecutive for two sequentially assigned codes, but is still based upon some information with regard to the time the code is assigned to the transmitter. In this fashion, it is no longer necessary to remember used codes, as each future assigned code will be ensured to be unique.

In a first embodiment, the code is assigned by incorporating information with regard to the manufacture time. The code thus has sections based upon the date and time at a minimum. Other ways of increasing the number of the available codes including the assigning of a plant code, an assembly line code, and additional random numbers, etc. can be utilized. In this fashion, there is no need to keep a database of previously used transmitter identification codes, since the date/time will never repeat. If the time is taken to include seconds, and also includes the date, there is a very high likelihood that no two codes will be the same. The use of additional plant and line codes will ensure there will be no repeating codes in the event that a particular time is the exact time assigned at two distinct assembly lines for two distinct transmitters.

As to what is meant by this application by the "time" the code is assigned, it should be understood that this time could be associated with when the code is first identified, first developed, or any other method. What is important is that the code is identified utilizing some time associated with some event. In this way, the unique code as described above will be achieved.

In a second embodiment, each receiver is assigned to a sequentially increasing digital number. That assigned number is then modified in some fashion such that it will no longer be sequential. In one proposed embodiment, the initial counter number can be modified by an EXCLUSIVE OR logic process with some standard bit pattern. As an example, if a bit pattern of repeating ones and zeros were subject to an EXCLUSIVE OR process with an initial counter, the final resulting number would be unique for the receiver, and non-sequential.

This embodiment provides the further function of utilizing all available codes with a minimal number of bits.

These and other features of the present invention can be best understood from the following specification and drawings, the following of which is a brief description.

DETAILED DESCRIPTION OF A PREFERRED EMBODIMENT

Figure 1:
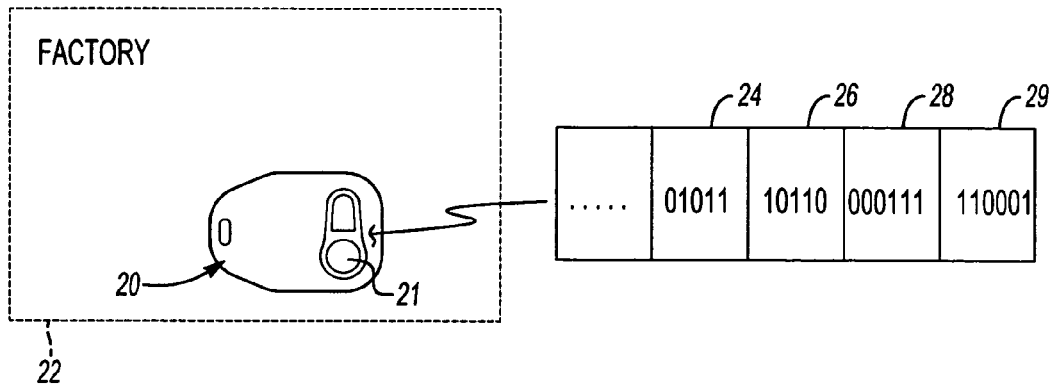
FIG. 1 is a schematic view of a factory assigning a transmitter identification code to a remote entry transmitter.

FIG. 1 shows a remote entry transmitter 20 including switches 21 such as for requesting a door lock/unlock functions. A factory is shown at 22, and is storing a code into the transmitter. As is known, each transmitter must be provided with an identification code, such that a vehicle receiving a signal from the transmitter can clearly identify whether the transmitter is appropriate for the vehicle.

In a first embodiment of this invention, the transmitter identification code is shown to include at least four types of information 24, 26, 28 and 29. The boxes of information 24, 26, 28 and 29 are shown as a series of digital bits. The bits are simply exemplary, and do not reflect the actual bits which may be utilized with this invention, either as to the number of bits, or the fact of whether a particular bit is a one or a zero.

However, in this embodiment, at least one of the sections 24 would preferably relate to the date of manufacture, another 26 would relate to the time, another 28 would relate to either the plant, or assembly line, or both, or neither could be a random number. The use of a random number for each assembly line may eliminate the need for having a particular code identifier for assembly line or plant. As mentioned above, if transmitters are being manufactured on parallel assembly lines, there is the possibility of an identical code based solely on date and time, and thus some use of another number may be preferred.

Figure 2:
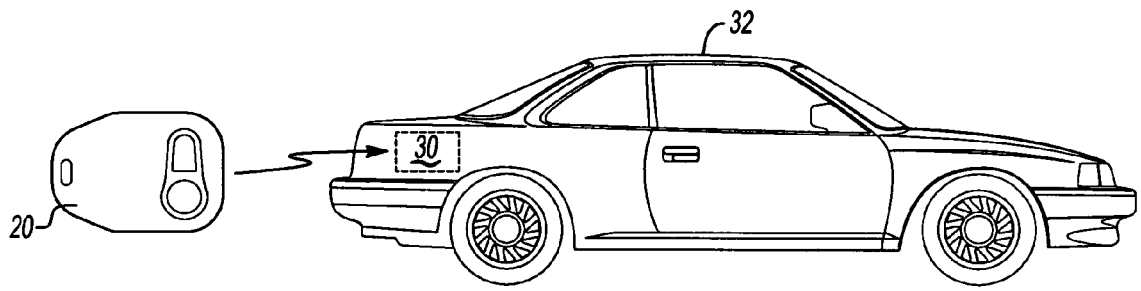
FIG. 2 shows the use of the remote entry transmitter with a vehicle.

Now, as shown in FIG. 2, once the transmitter has been programmed for its code, it can transmit a signal to a control 30 on a vehicle 32. The control 30 has been taught the transmission identification code for the transmitters 20 which are assigned to the vehicle 32. As an initial step in receiving the signal from the transmitter 20, the control 30 compares the received code to the expected code. If the received code is appropriate, it then evaluates what signal or operation is being requested, and then will perform that operation (i.e., unlock the doors).

The use of a transmission identification code which incorporates date and time to which the code is initially assigned ensures that the codes will all be unique. The exact date and time will not repeat, and thus the use of this method ensures that each future-assigned transmission identification code will be distinct from all previously assigned codes.

Since the codes will always be distinct, there is no need to store previously used codes. Instead, the invention will self-ensure that no two codes are identical.

Figure 3:
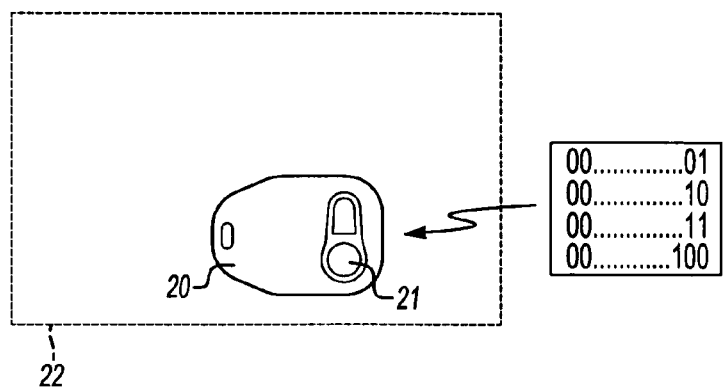
FIG. 3 shows a second embodiment.

In a preferred embodiment the FIG. 3 counter information is sent to an EXCLUSIVE OR operation with a bit pattern. As one example, the bit pattern can be a series of repeating ones and zeros. The output of the EXCLUSIVE OR of the counter number and the bit pattern will be a unique series of numbers which will be unique for any input from the counter, but will also be non-sequential. In this fashion, the second embodiment provides a simplified way of providing transmission identification codes in a way which does not require they be stored.

Since the code is provided by initially assigning a counter number in a sequential fashion, and then modifying that sequentially assigned counter number with some other operation to ensure the final code is non-sequential, and always unique. Setting the counter in a sequential manner will ensure that all codes are distinct, however, and thus the main goal of this invention will still be achieved. This embodiment provides the additional benefit of utilizing all available codes for a given number of bits, which may not ever be achieved by the date and time assigning method.

Although preferred embodiments of this invention have been disclosed, a worker in this art would recognize that certain modifications would come within the scope of this invention. For that reason the following claims should be studied to determine the true scope and content of this invention.

The invention claimed is:

1. A method of assigning an identification code to a remote entry transmitter comprising the steps of:

1) providing a number which varies by the time a code is assigned relative to other codes, and ensuring that the codes are non-sequential for codes assigned sequentially, said code also being indicative of a date and time associated with the assignment of said code; and 2) storing said code in a remote entry transmitter as a remote entry transmitter identification code.

2. A method as set forth in claim 1, wherein said code is determined by incorporating the date and time that the code is set, into the code itself.

3. A method as set forth in claim 2, wherein the said code also incorporates information with regard to the particular assembly line.

4. A remote entry transmitter comprising:

a transmitter body having a switch for requesting a vehicle component to perform an operation; and a transmitter for transmitting a code, said code being a transmitter identification code stored in said remote entry transmitter and incorporating information which is both non-sequential, and yet which varies in order of the time the code was determined, said code carrying information associated with the date and time that said code was assigned.

5. A method as set forth in claim 1, wherein said remote entry transmitter is utilized as part of a remote access system for a vehicle door.

6. A remote entry transmitter as set forth in claim 4, wherein said transmitter is utilized to transmit a code to a receiver on a vehicle to provide access to the doors on the vehicle.

* * * * *